Patented July 17, 1934

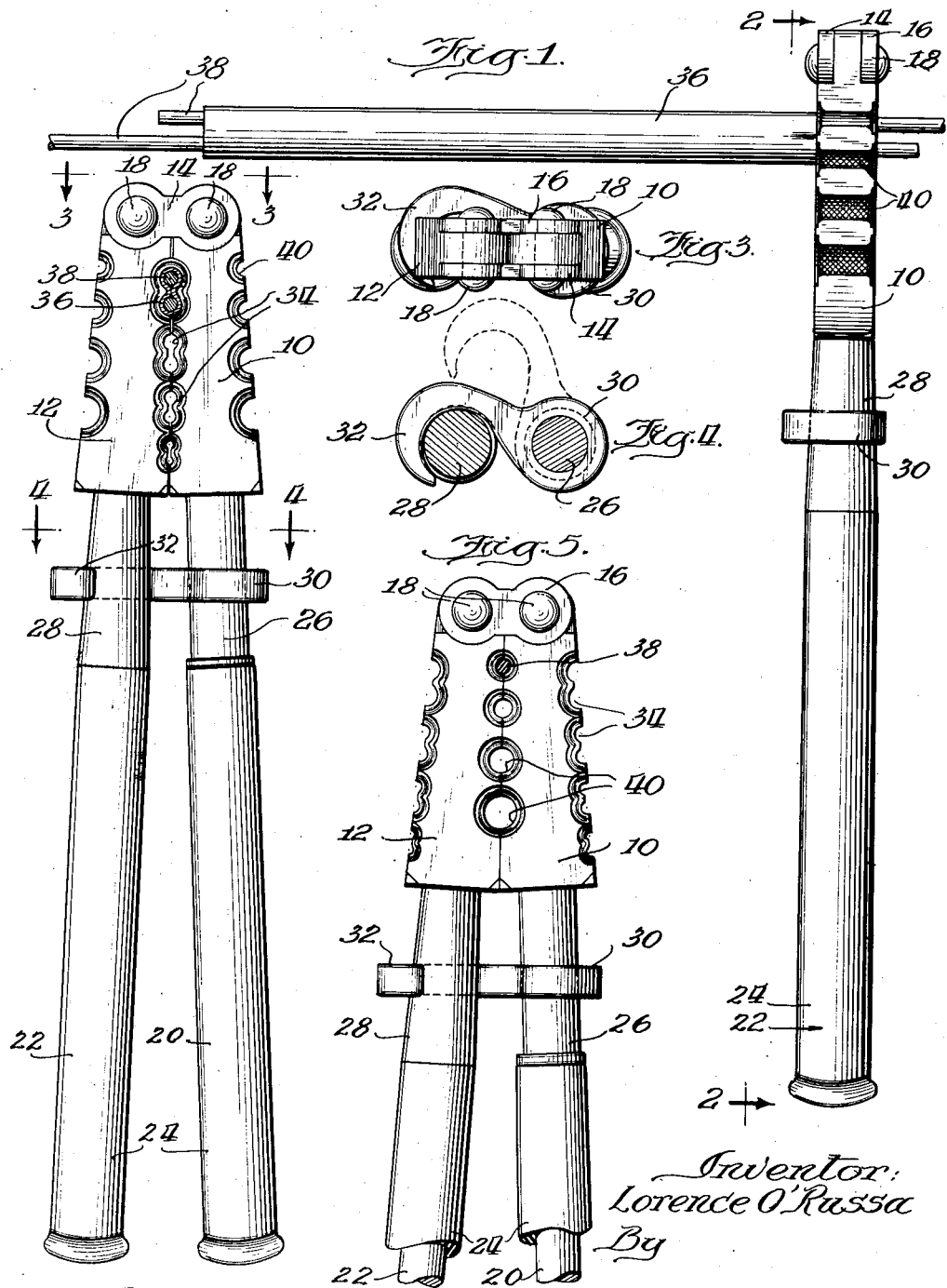

1,966,593

UNITED STATES PATENT OFFICE 1,966,593

WIRE SPLICING TOOL

Lorence O'Russa, Princeville, Ill., assignor to Mathias Klein & Sons, Chicago, Ill., a corporation of Illinois Application June 5, 1933, Serial No. 674,336

3 Claims. (Cl. 140—118)

My invention relates generally to gripping tools such as pliers, tongs, etc., and more particularly to improvements in a gripping tool for wire splicing.

It is an object of my invention to provide a gripping tool having improved means for holding the jaws in clamping engagement with the work.

A further object is to provide an improved gripping tool for wire splicing which may be used with a high degree of safety in electrical construction and repair work.

Other objects will appear from the following description, reference being had to the accompanying drawing, in which:

Fig. 1 is a side elevation of the tool showing it applied to a wire splicing sleeve;

Fig. 2 is an elevational view thereof taken on the line 2—2 of Fig. 1;

Fig. 3 is a plan view;

Fig. 4 is a transverse sectional view taken on the line 4—4 of Fig. 2; and

Fig. 5 is a fragmentary elevation showing the jaws reversed.

In the use of pliers, tongs, and similar gripping tools it is frequently desirable to clamp the tool to the work so as to relieve the user of the necessity of maintaining a tight clamping pressure upon the handle of the tool. Various expedients for accomplishing this purpose have been proposed and many used, but these devices could not with safety be applied to a tool of this type for use in electrical construction and repair work, since in most of these devices the clamping mechanism was of metal and attached to the ends of the handles where it would be touched by the user's hand and thus present a possibility of transmitting an electric shock. Furthermore, in many of these devices the means for holding the handles together with the tool clamped about the work were not adjustable for use with pieces of work of different sizes.

The clamping device which I have provided may be used on tools having insulated handles and may be very easily operated to hold the jaws firmly clamped together.

The tool shown for purposes of illustration comprises a pair of jaws 10, 12 which are joined at their ends by a pair of links 14, 16 pivotally connected to the jaws by shouldered rivets 18. The jaws 10, 12 are preferably forged integrally with handles 20, 22, the major portions of which are covered with a suitable coating 24 of insulating material. The handle 20 has a cylindrical shank portion 26 adjacent the jaw 10, while the handle 22 has a corresponding shank portion 28 which is tapered. A hook 30 is mounted for rotation and sliding movement upon the cylindrical shank portion 26, and has a bill 32 arranged to engage about the tapered shank portion 28. The jaws 10, 12 may have any suitably conformed gripping surface, and are shown as provided with recesses 34 adapted to encompass a wire splicing sleeve 36 and deform it tightly about the two conducting wires 38, and upon their other faces with recesses 40 adapted to grip a wire.

When the gripping tool is to be attached to a splicing sleeve as shown in Fig. 1, it is applied thereto in the usual manner, and when the jaws have been firmly pressed about the sleeve the hook 30 is swung from the dotted line position in which it is shown in Fig. 4 to the full line position shown in said figure, and then slid away from the jaws until the bill of the hook wedges against the tapered surface of the shank portion 28 and thus firmly holds the jaws together. The angle of the taper is such that the hook 30 will be frictionally held in position.

When it is desired to clamp the tool upon a wire the jaws may be swung about so as to bring the recesses 40 in clamping engagement about a wire, and the hook 30 operated in a manner similar to that above described to clamp the jaws together about the wire as shown in Fig. 5. In using the tool in electrical work, the danger of accidental shock is greatly reduced since the ends of the handles are thoroughly insulated, and as the tool is swung about in twisting the connecting sleeve 36 the possibility of the engagement of an exposed metallic portion of the tool with a live conductor is reduced.

While I have shown and described particular embodiments of my invention it will be readily understood by those skilled in the art that variations may be made in the constructions disclosed without departing from the basic features of my invention. I therefore do not wish to be limited to the precise construction disclosed but wish to include within the scope of my invention all such modifications and variations which will readily suggest themselves.

What I claim as new and desire to secure by Letters Patent of the United States, is:

1. A gripping tool comprising a pair of pivoted members each comprising a jaw, a shank, a handle portion, the shank of one of said members being substantially cylindrical and the shank of the other of said members being tapered, and a hook pivotally and slidably mounted upon said cylindrical shank and constructed and arranged to hook over said tapered shank portion and by being slid toward the portion of the tapered shank of greater diameter to hold the jaws in tight engagement about an object to be held.

2. A gripping tool comprising a pair of pivotally joined members, work engaging jaws formed on said members at adjacent ends thereof, handles at the other ends of said members, one of said members having a cylindrical shank portion and the other member having a tapered shank portion, and a hook pivoted on said cylindrical shank portion and slidable longitudinally thereof, said hook being engageable with said tapered shank portion at any point thereof necessary to hold the jaws in gripping engagement with the work.

3. A gripping tool comprising a pair of members each comprising a jaw, a shank portion and an insulated handle, the shank portion of one of said members being tapered and the shank portion of the other of said members being cylindrical, a link connection between the ends of said jaws for pivotally connecting said members to enable one of said jaws to be swung through an angle of approximately 180° relative to the other jaw thereby to bring opposite sides of said jaws into position for engaging a piece of work, and a hook mounted for pivotal and longitudinal sliding movement on the shank portion of one of said members and adapted to have its hook engaged over the shank portion of the other member.

LORENCE O'RUSSA.